(12) United States Patent
Lam et al.

(10) Patent No.: US 8,432,537 B2
(45) Date of Patent: Apr. 30, 2013

(54) PHOTOELASTIC COATING FOR STRUCTURAL MONITORING

(76) Inventors: Duhane Lam, Vancouver (CA); Mark William Ellens, Richmond (CA)

( * ) Notice: Subject to any disclaimer, the term of this patent is extended or adjusted under 35 U.S.C. 154(b) by 634 days.

(21) Appl. No.: 12/481,573

(22) Filed: Jun. 10, 2009

(65) Prior Publication Data

US 2009/0310121 A1 Dec. 17, 2009

Related U.S. Application Data

(60) Provisional application No. 61/061,958, filed on Jun. 16, 2008.

(51) Int. Cl.
*G01B 11/16* (2006.01)
(52) U.S. Cl.
USPC .......................................................... 356/35
(58) Field of Classification Search ............... 356/35
See application file for complete search history.

(56) References Cited

U.S. PATENT DOCUMENTS

| | | | | |
|---|---|---|---|---|
| 2,920,480 A * | 1/1960 | Haas | | 73/787 |
| 3,067,606 A * | 12/1962 | Oppel | | 356/34 |
| 3,178,934 A * | 4/1965 | O'Regan | | 356/34 |
| 3,216,312 A * | 11/1965 | Oppel | | 359/489.19 |
| 3,313,204 A * | 4/1967 | Oppel | | 356/34 |
| 3,994,598 A * | 11/1976 | Reytblatt | | 356/34 |
| 4,008,960 A * | 2/1977 | Reytblatt | | 356/33 |
| 4,109,515 A | 8/1978 | Swenson, Jr. | | |
| 4,112,746 A * | 9/1978 | Itoh et al. | | 73/789 |
| 4,164,874 A * | 8/1979 | Cassatt et al. | | 73/799 |
| 4,252,440 A * | 2/1981 | Frosch et al. | | 356/216 |
| 4,758,464 A | 7/1988 | Masuzawa et al. | | |
| 4,777,358 A * | 10/1988 | Nelson | | 250/225 |
| 5,400,131 A * | 3/1995 | Stockley et al. | | 356/33 |
| 5,531,123 A * | 7/1996 | Henkel | | 73/795 |
| 5,534,289 A | 7/1996 | Bilder | | |
| 5,568,259 A * | 10/1996 | Kamegawa | | 356/625 |
| 5,699,159 A | 12/1997 | Mason | | |
| 5,789,680 A * | 8/1998 | Fujimoto | | 73/799 |
| 6,055,053 A * | 4/2000 | Lesniak | | 356/366 |
| 6,072,568 A * | 6/2000 | Paton et al. | | 356/32 |
| 6,094,259 A * | 7/2000 | Kamegawa | | 356/32 |

(Continued)

OTHER PUBLICATIONS

Dulieu-Barton, J.M., "Full-field Experimental Stress/strain Analysis of Sandwich Structures", Book Section—Advanced School of Sandwich Strucures 2008 (Lectures), May 2008, 14 pages in total, ID code: 51207.

Calvert, G., J. Lesniak, and M. Honlet, "Applications of Modern Automated Photoelasticity to Industrial Problems", Insight, vol. 44, No. 4, Apr. 2002, pp. 1-4.

(Continued)

*Primary Examiner* — Roy M Punnoose

(57) ABSTRACT

A photoelastic coating for structural monitoring of bridges, buildings, and other structures comprises an optically translucent or transparent photoelastic layer. The photoelastic coating is applied to the structure as a solvent-based liquid or gel. The photoelastic properties of the photoelastic layer are used to detect stress and strain or plastic deformation in the structure using photoelastic techniques. Also described is a method of structural monitoring comprising applying a photoelastic coating to a structure as a solvent-based liquid or gel. Presence of fringe patterns in the reflected light from the photoelastic layer indicates the presence of stress and strain in the photoelastic layer. Stress and strain in the photoelastic layer indicates stress and strain or plastic deformation in the underlying structure. The invention can be used for detecting when structures have been overloaded or when stress limits have been exceeded.

21 Claims, 5 Drawing Sheets

U.S. PATENT DOCUMENTS

| | | | |
|---|---|---|---|
| 6,219,139 B1 | 4/2001 | Lesniak | |
| 6,327,030 B1 * | 12/2001 | Ifju et al. | 356/32 |
| 6,460,418 B1 * | 10/2002 | Hiyoshi | 73/800 |
| 6,588,282 B2 | 7/2003 | Arms | |
| 6,650,405 B2 * | 11/2003 | Lam et al. | 356/33 |
| 6,928,881 B2 | 8/2005 | Brennen | |
| 6,943,869 B2 * | 9/2005 | Hubner et al. | 356/34 |
| 6,981,423 B1 | 1/2006 | Discenzo | |
| 6,985,214 B2 * | 1/2006 | Szaroletta et al. | 356/34 |
| 7,230,421 B2 * | 6/2007 | Goldfine et al. | 324/240 |
| 7,377,181 B2 * | 5/2008 | Christ et al. | 73/800 |
| 7,477,389 B2 * | 1/2009 | Saha | 356/365 |
| 7,509,872 B2 * | 3/2009 | Hyodo et al. | 73/800 |
| 2004/0066503 A1 * | 4/2004 | Hubner et al. | 356/34 |
| 2005/0164596 A1 * | 7/2005 | Saha | 446/131 |
| 2006/0007424 A1 * | 1/2006 | Hubner et al. | 356/34 |
| 2006/0192177 A1 | 8/2006 | Chen et al. | |
| 2008/0094609 A1 * | 4/2008 | Ragucci et al. | 356/34 |
| 2008/0233446 A1 * | 9/2008 | Zimmermann et al. | 429/25 |

OTHER PUBLICATIONS

Mita, Akira, and Sinpei Takahira, "Peak Strain and Displacement Sensors for Structural Health Monitoring", 3rd International workshop onStructural Health Monitoring, Stanford University, Sep. 12-14, 2001, pp. 1-8.

Agarwal, R.B., and L.W. Teufel, "Epon 828 Epoxy: A New Photoelastic Model Material", Experimental Mechanics, vol. 23, No. 1, Mar. 1983, pp. 30-35.

Hexion Specialty Chemicals, "Epon Resin 828 Technical Data Sheet", HCD-3942 (Rev Jun. 1, 2009 6:59:36 PM).

Vishay Micro-Measurements, "PhotoStress Coating Materials and Adhesives", Document No. 11222, Revision 14—Apr. 4, www.vishaymg.com.

Vishay Micro-Measurements, "Instructions for Casting and Contouring PhotoStress Sheets", Application Note IB-221-D, Doc. 11221, Rev. 03—Dec. 7, www.vishaymg.com.

* cited by examiner

PHOTOELASTIC COATING FOR STRUCTURAL MONITORING

CROSS-REFERENCE TO RELATED APPLICATIONS

This application is entitled to the benefit of the filing date of U.S. Provisional Patent Application No. 61/061,958 filed Jun. 16, 2008.

TECHNICAL FIELD

The present invention relates to the fields of structural monitoring, stress and strain detection, non-destructive testing, and photoelastic analysis.

BACKGROUND ART

Stress and Strain Measurement

Strain, e, is a dimensionless response to stress expressed as a fraction $e=\Delta L/L_o$ where $L_o$ is the original length of the object and $\Delta L$ is the change in length of the object when stress is applied. Stress, s, is a measure of force per unit area given by F/A where F is the force being applied and A is the area it is being applied to. Because stress cannot be measured directly in practice, strain is measured instead. The stress in an object is related to the strain by the Young's Modulus, E, which is given by the following relationship:

$$E = s/e_{el} = \frac{(F/A)}{(\Delta L/L_o)} = \text{stress/strain}.$$

Knowing the Elastic Modulus of a given material, the stress in the material can be determined by measuring the strain. Traditionally, stress and strain measurements have been accomplished by a number of different methods. Some of these methods are described below.

Brittle Coatings

Brittle lacquer is a brittle coating that cracks easily under tensile strain. The lacquer is applied to the unstressed part. When the part is stressed, the brittle lacquer cracks, starting at the areas of highest strain. Brittle lacquer is difficult to work with and does not provide a quantitative measure of the stress and strain. As such, the brittle lacquer method can only indicate which areas of a part are experiencing stress and strain. Also, only one test is possible with a given application of brittle lacquer. Once the brittle lacquer has cracked, the coating must be stripped off and reapplied for subsequent tests. One supplier of brittle lacquer coatings is StressCoat Inc. of Upland, Calif.

A similar type of coating that cracks under strain and can thus be used to detect strain is disclosed by Ifju et al (U.S. Pat. No. 6,327,030). Ifju's coating is luminescent and changes in strain cause cracks that can be seen because of the different properties in how the coating luminesces. The problem with this type of coating as with all brittle coatings is they are difficult to apply and use. Only one test is possible and the brittle coatings are typically not suitable for use in production parts and structural monitoring applications where environmental and corrosion protection are required.

Because of the disadvantages and the complexity of strain gages, brittle lacquer, and fiber-optics, these techniques for measuring stress and strain are typically used only at the product development stage for high-value products such as aircraft parts. Production parts and structures such as bridges and buildings generally do not come with built-in strain gages for monitoring stresses and strains, although this might be desirable in some cases. For example, monitoring the stresses and strains in a bridge or overpass could be useful for ensuring the safety of that structure. However, the cost of existing monitoring methods are prohibitive for widespread deployment into structures such as bridges, buildings, and industrial equipment. Existing techniques of detecting stress and strain are expensive enough to make them somewhat prohibitive even on prototypes at the product development stage.

Non Destructive Testing

Non-Destructive Testing (NDT) methods are used to inspect structures to determine if they are still structurally sound, or if failure is imminent. However, existing NDT techniques are typically expensive to apply and cannot detect certain types of failure such as plastic deformation and some structural overloading that does not result in cracks. Existing NDT techniques include liquid penetrant tests, eddy-current tests, and X-Ray testing. NDT techniques described can typically detect voids or cracks, but cannot typically detect whether a structural component has been subjected to a stress that is too high, or whether it has experienced any plastic deformation.

Structural Monitoring

Structures such as buildings, bridges, airplanes, industrial equipment and other critical structures are prone to failure. Failure can happen with significant loss of life and property, as evidenced by the recent collapse of the I-35 bridge in Minnesota. As such, structural monitoring is becoming an even more important field and can have a significant impact on public health and safety. For example, there are about 600,000 bridges in the USA alone, of which about 25% of bridges were considered deficient or obsolete in 2007 according to the US Department of Transport. As this infrastructure further ages and the concern for public safety increases, structural monitoring will become more and more critical. However, budgets for carrying out inspections of public structures such as bridges are very low. Prior art approaches to structural monitoring are typically too expensive, impractical, and/or insufficient for addressing the growing need for structural monitoring, particularly the structural monitoring of bridges.

Prior art approaches to structural monitoring typically involve expensive monitoring devices and expensive monitoring systems. A prior art system that involves the use of a linear transducer is disclosed by Arms (U.S. Pat. No. 6,588,282). The transducer has two components that move relative to one another, and a clamping mechanism is used to prevent the shortening of the relative strain between the two components. This system has disadvantages because of the moving parts involved, and the precise orientation required for those moving parts to work. Also, the system requires some sort of electronic system to detect the signal. These factors combine to make this system expensive and less suitable for large scale deployment for structural monitoring.

Another prior-art approach to structural monitoring is disclosed by Brennen (U.S. Pat. No. 6,928,881). Brennen's approach involves the use of strain gauges mounted in a housing along with instrumentation that records and stores the stress levels experienced by the structure. While this approach can give an accurate time history of stresses experienced by a structure, it can be prohibitively expensive because of the use of on-board monitoring and storage. The collection of all the historical stress data can be inefficient and unnecessary. The regular storage and retrieval of all the data can be very expensive and can require frequent visits to perform downloads. Also, because data will only be recorded at a certain sampling rate, it is possible with Brennen's system to miss key events such as stress strain peaks. This could lead to false conclusions regarding the safety of the structure because key peak events have been missed. Increasing the sampling rate to try to capture these peak key events means more data needs to be stored. Reducing the sampling rate in order to reduce the amount of data stored only makes the problem of missing key events worse.

Bilder et al, (U.S. Pat. No. 5,534,289) discloses a method of structural crack detection that involves the use of microcapsules in a coating that will burst and change the colour of a second coating layer. The coatings also provide environmental protection for the structural part. This method however can only detect cracks, and the requirement of microcapsules containing coloured dyes can make the method difficult and expensive.

Photoelastic Techniques

Photoelastic techniques are optical techniques for detecting stress and strain that exploit the photoelastic properties of certain materials. The speed of propagation of light in transparent materials is generally slower than in a vacuum or in air. The ratio of the speed of light in a given material to the speed of light in a vacuum is called the index of refraction of that material. In homogeneous materials, the index of refraction is constant regardless of the direction of propagation or plane of vibration of the light. In other materials, strain in the material causes the index of refraction to change depending on the direction of propagation of light. These materials, which can be optically isotropic when unstrained, become optically anisotropic when strain is present.

Materials that become optically anisotropic when stressed are known as photoelastic materials. The change in index of refraction relative to index axis in the material can typically be related to the stress and strain in the material by observing and quantifying the photoelastic effect. The photoelastic effect is caused by alternately constructive and destructive interference between light rays that have undergone relative retardation, or phase shift, in the stressed photoelastic material. When illuminated with polarized light and viewed through a polarizing filter, fringe patterns become visible in the photoelastic material that reveal the overall stress and strain distribution in the part and show the locations and magnitudes of the stresses and strains in the part. A person skilled in the art of photoelastic analysis can interpret and measure these patterns.

Photoelastic Coatings

Photoelastic coatings have traditionally only been used for laboratory testing or prototype testing because of the cost of the coatings, the difficulty of applying the coatings, and the unsuitability of the coatings for production components or for applying to structures in the field. Photoelastic coatings are available from companies such as Measurements Group (http://www.vishay.com/company/brands/measurements-group/) in sheet form, and also in a liquid plastic form that is cast onto a part to for the shape and then bonded on using adhesive. Both these types of coatings can be cost and labour-intensive to apply, and are not well suited for complex parts, large parts, or parts made in higher quantities.

Lam and Ellens disclose a method for applying a photoelastic coating using powder coating techniques (U.S. Pat. No. 6,650,405) that is low cost, easy to apply, and can be used on parts with complex three-dimensional shapes. The application of a photoelastic coating using powder coating methods is much less expensive than the cost of applying traditional photoelastic coatings. The use of a photoelastic layer applied using powder coat is for example suitable for application to parts that are made in higher quantities for field use. Once powder coated with the photoelastic layer, the parts and structures can then be inspected quickly and easily in the field using photoelastic techniques to determine if any strain is present in the part or if any plastic deformation has occurred. This can be a useful and low cost method of monitoring parts and can increase public safety by helping with early detection of failures before the failures become catastrophic.

However, the method of applying a photoelastic coating techniques as disclosed by Lam and Ellens in U.S. Pat. No. 6,650,405 suffers from a number of limitations. For example, applying a photoelastic coating with powder coating is limited in its applicability to structural monitoring of larger structures such as bridges, buildings, and larger aerospace components, particularly in the field. One limitation is that powder coating is applied as a dry finely-divided solid powder and typically needs to be baked on by increasing the temperature of the powder and the part being coated to an elevated level (typically from 100° C. to 200° C.). This can be impractical or inconvenient for large parts such as bridge trusses and large beams because these parts may not fit into an oven, and also because the energy required to heat these parts up to the temperature required can be prohibitive and energy inefficient. It may also not be practical to apply powder coating to some structures already in use, particularly if they are installed on a permanent basis in the field. Finally, some structural parts and components are made out of materials that cannot be heated to the elevated temperatures required for curing powder. For example, some times of alloys are subjected to heat treatments that can be affected if the part is subsequently heated to an elevated temperature. Applying a photoelastic layer to these parts using powder coating may not be practical or possible.

In summary, applying a photoelastic coating using powder coating methods provides significant advantages because the coating is inexpensive and can be applied to complex three dimension parts. It can provide both environmental protection and stress strain information using photoelastic techniques. However, powder coating can be an impractical or inconvenient method for applying a photoelastic coating for a number of reasons:

Difficulty of applying a powder coated photoelastic layer to structures already installed in the field Difficulty of applying a powder coated photoelastic layer to large structures such as bridges and buildings.

Power coating can typically only be applied to materials that can carry an electric charge such as metals.

Applying a powder coated photoelastic layer to a large structure with significant thermal mass requires too much energy to heat up the structure to fuse the powder coating together.

Some materials (e.g., some heat-trated alloys) cannot be subjected to the elevated temperatures required for baking and fusing the powder coated photoelastic layer together.

SUMMARY OF INVENTION

An object of the present invention is to provide a structural monitoring coating for monitoring structures such as bridges, buildings, airplanes, and industrial equipment. In accordance with an aspect of the present invention, there is provided a structural monitoring coating comprising an optically translucent or transparent photoelastic layer. The photoelastic layer is applied to the structure as a solvent-based liquid or gel that can be cured without heating. The photoelastic properties of the photoelastic layer can be used to detect stress and strain or plastic deformation in the structure using photoelastic techniques.

In accordance with another aspect of the invention, there is provided a method for structural monitoring using a photoelastic coating. The method comprises the steps of providing a structure for which structural monitoring is desired, applying a photoelastic layer to said structure as a solvent-based liquid or gel, and curing said photoelastic layer in place on said structure. The method further comprises subjecting the structure to a load and inspecting the structure using photoelastic techniques to detect for stress and strain in the photoelastic layer. Presence of fringe patterns in the reflected light from said photoelastic layer indicates the presence of stress and strain in said photoelastic layer. Stress and strain in said photoelastic layer indicates stress and strain or plastic deformation in the underlying structure.

BRIEF DESCRIPTION OF DRAWINGS

Having thus generally described the nature of the invention, reference will now be made to the accompanying drawings, showing by way of illustration several embodiments thereof, and in which.

DESCRIPTION OF EMBODIMENTS

The following detailed description includes references to the accompanying drawings, which form a part of the detailed description. The drawings show, by way of illustration, specific embodiments in which the invention may be practiced. These embodiments, which are also referred to herein as "examples", are described in sufficient detail to enable those skilled in the art to practice the invention. The embodiments may be combined, other embodiments may be utilized, or structural, mechanical, and material composition changes may be made without departing from the scope of the present invention. The following detailed description is, therefore, not to be taken in a limiting sense, and the scope of the present invention is defined by the appended claims and their equivalents.

In accordance with the present invention, a structural monitoring coating and method for structural monitoring is disclosed that can provide information about the stresses and strain experienced by a structure being monitored. The structural monitoring coating comprises a photoelastic layer applied as a solvent-based liquid or gel. The present invention in particular solves the problem of applying structural monitoring coatings using a powder coated photoelastic layer. Applying a photoelastic coating using dry powder coating methods can be inconvenient or impractical, particularly in the case of larger structures and structures pre-existing in the field, such as bridges and buildings. Once applied as a solvent-based liquid or gel, the structural monitoring coating can then cured at ambient temperatures through evaporation of the solvent, by addition of a chemical hardener, or by ultraviolet (UV) or visible light curing. The coating can be applied and cured in the field. The current invention describes the novel incorporation of photoelastic properties into a structural monitoring coating to permit monitoring of structures such as bridges, buildings, and industrial equipment using photoelastic techniques. In an embodiment according to the present invention, the structural monitoring coating can at the same time provide environmental protection for the structure.

Figure 1:
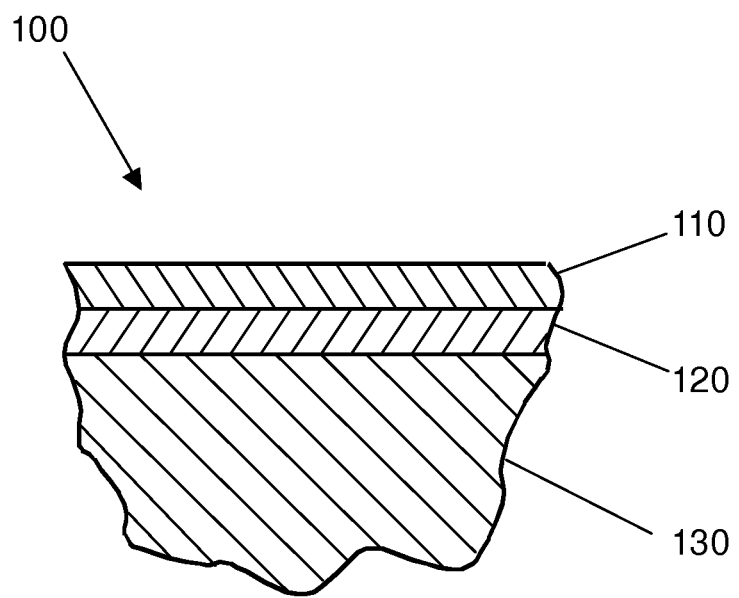
FIG. 1 is a schematic view a photoelastic structural monitoring coating according to an embodiment of the present invention.

Description of Example of a Photoelastic Structural Monitoring Coating—FIG. 1

FIG. 1 is a schematic diagram showing a photoelastic structural monitoring coating according to an embodiment of the present invention. Photoelastic structural monitoring coating 100 comprises a reflective layer 120 attached to a structure 130, and a photoelastic layer 110 coated on top of reflective layer 120. Structure 130 is a structure to be monitored for stress and strain or for overloading. For example, structure 130 could be part of a bridge, a building, an airplane, a piece of industrial equipment, or some other structure.

Reflective layer 120 can be any opaque layer that helps to reflect light when a transparent or translucent layer is applied on top of it. Reflective layer 120 is typically a silvery colour and can be used to provide better reflectivity of light back through photoelastic layer 110. Reflective layer 120 may not be required if the surface of structure 130 is adequate for helping reflect light (e.g., the silvery surface of a metallic structure). The reflective layer can be applied using a number of techniques, including powder coating, coating with wet paint, or some other method of applying a layer of silvery material onto structure 130.

Photoelastic layer 110 comprises a translucent or transparent material with photoelastic properties. Possible materials include epoxies and other optically translucent or transparent polymers. Photoelastic layer 110 can be applied to structure 130 either on top of reflective coating 120 or directly to structure 130. Photoelastic layer 110 is applied as a solvent-based liquid or gel. It can then be cured in place through evaporation of the solvent, addition of a chemical hardener, curing using ultra-violet (UV) or visible light, or some other method of curing. The curing of photoelastic layer 110 does not require baking or elevated temperatures. The curing can occur at temperatures below 100° C. In fact curing can occur in ambient temperatures in the range from −15° C. to 65° C. with the proper selection of solvents selected by one skilled in the art. An example of an epoxy that has photoelastic properties is the EPON 828 resin from Hexion Specialty Chemicals of Columbus, Ohio. Traditionally, EPON 828 has only been used for casting small prototype photoelastic models for prototype purposes. According to the present invention, it can be used as a basis for a photoelastic structural monitoring coating on structures such as bridges and buildings. Other epoxies and materials can also be used.

When photoelastic layer 110 has cured, it can adhere to structure 130 or reflective layer 120 without the need for any additional adhesive and forms a solid translucent or transparent coating over structure 130 that exhibits photoelastic properties (the index of refraction in the material is isotropic when unstrained and becomes anisotropic when subjected to strain). The coating can also provide structure 130 with environmental protection from things such as corrosion, weathering, and physical damage. For example, EPON 828 resin has good mechanical, adhesive, and chemical resistance properties when cross-linked or hardened with appropriate curing agents. Photoelastic structural monitoring coating 100 therefore can serve a dual purpose of providing environmental protection as well as allowing for safety inspections of underlying structure 130 using photoelastic methods.

Figure 2:
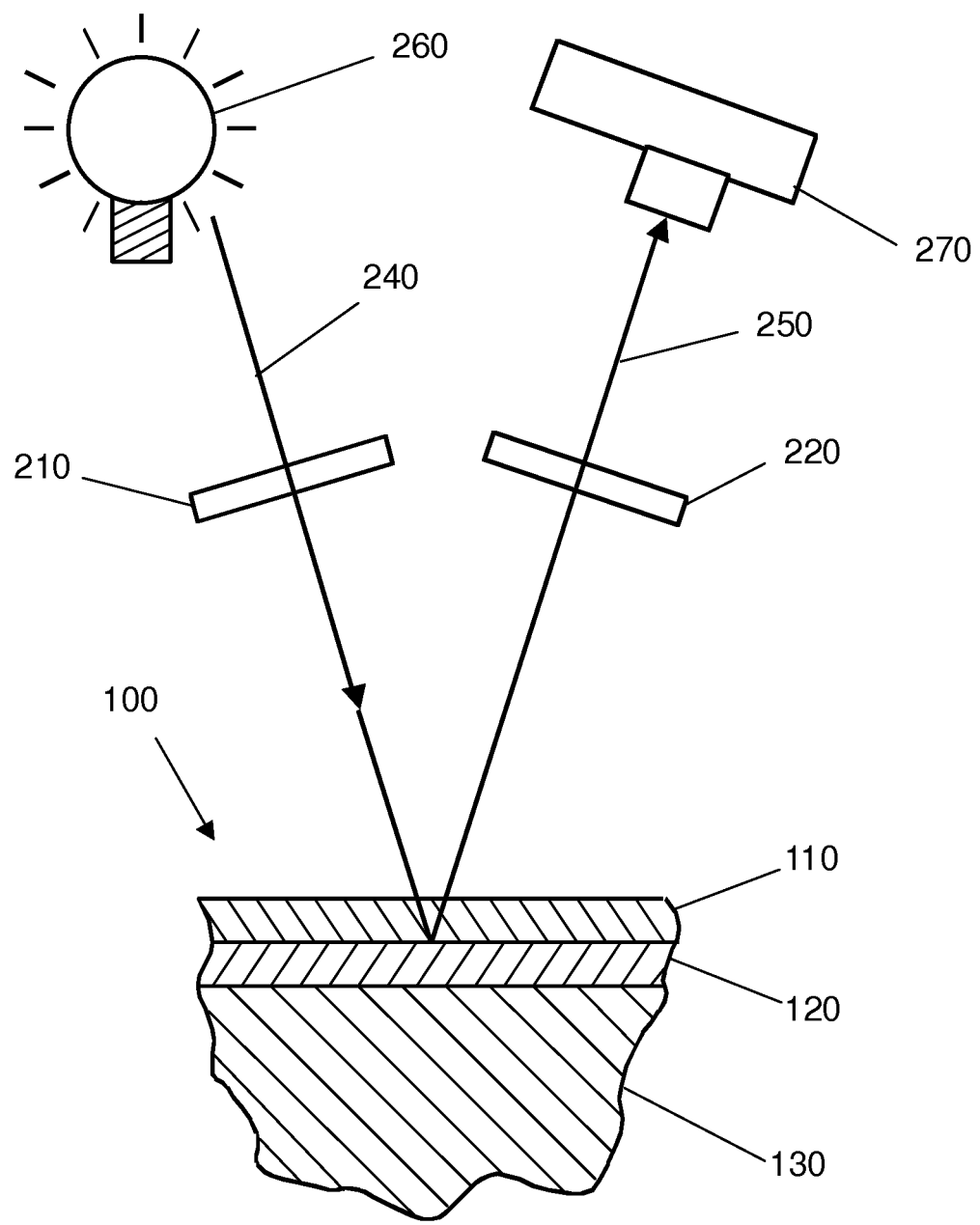
FIG. 2 is a is diagrammatic view showing the use of a photoelastic structural monitoring coating according to an embodiment of the present invention.

Description of Example of a Photoelastic Structural Monitoring Coating—FIG. 2

FIG. 2 is a diagrammatic view showing a photoelastic structural monitoring coating being used for photoelastic analysis according to an embodiment of the present invention. Photoelastic structural monitoring coating 100 comprises a photoelastic layer 110 and a reflective layer 120 coated onto a structure 130. Photoelastic layer 110 comprises a photoelastic material such as a polymer attached to structure 130 on top of reflective layer 120. According to the present invention, photoelastic layer 110 is applied as a solvent-based liquid or gel that cures without the need for baking. Reflective layer 120 is optional and may not be required if the surface of structure 130 is suitable as a reflective backing. For example, if the surface of structure 130 is made out of steel or silver, an additional reflective backing may not be required.

Photoelastic analysis can be carried out on structure 130 making use of photoelastic structural monitoring coating 100 by illuminating photoelastic layer 110 with a light source 260 that is filtered through a polarizing filter 210. Polarizing filter 210 can also be integrated with light source 260 to provide a polarized light source. Incident light 240 from light source 260 passes through polarizing filter 210 and photoelastic layer 110, reflects off reflective layer 120, and passes back through photoelastic layer 110. Reflected light 250 is passed through a second polarizing filter 220. The reflected light 250 can be detected and recorded by a camera 270 or some other instrument, or it can be viewed by an observer to determine if any fringe patterns are evident in reflected light 250. Camera 270 can be integrated with polarizing filter 220 in the form of a specialized instrument for photoelastic analysis. Fringe patterns observed in reflected light 250 from photoelastic layer 110 indicate the presence of strain in photoelastic layer 110. Because photoelastic layer 110 is bonded to structure 130, presence of strain in photoelastic layer 110 indicates stress or strain or permanent deformation in structure 130. The number and appearance of the fringe patterns in evidence indicate the degree of strain being experienced in photoelastic layer 110. The sensitivity of photoelastic layer 110 depends on the material and the thickness of photoelastic layer 110. If the underlying structure 130 is no longer under load when fringe patterns are detected in photoelastic layer 110, the presence of fringe patterns can indicate that plastic deformation has occurred in structure 130. This can indicate that structure 130 has been subjected to loads sufficient to cause the material in structure 130 to reach and exceed the yield point of the material. In this way, a structure such as a bridge or a building can be inspected at regular intervals or after a major event to determine of the bridge or building has been overloaded.

Figure 3:
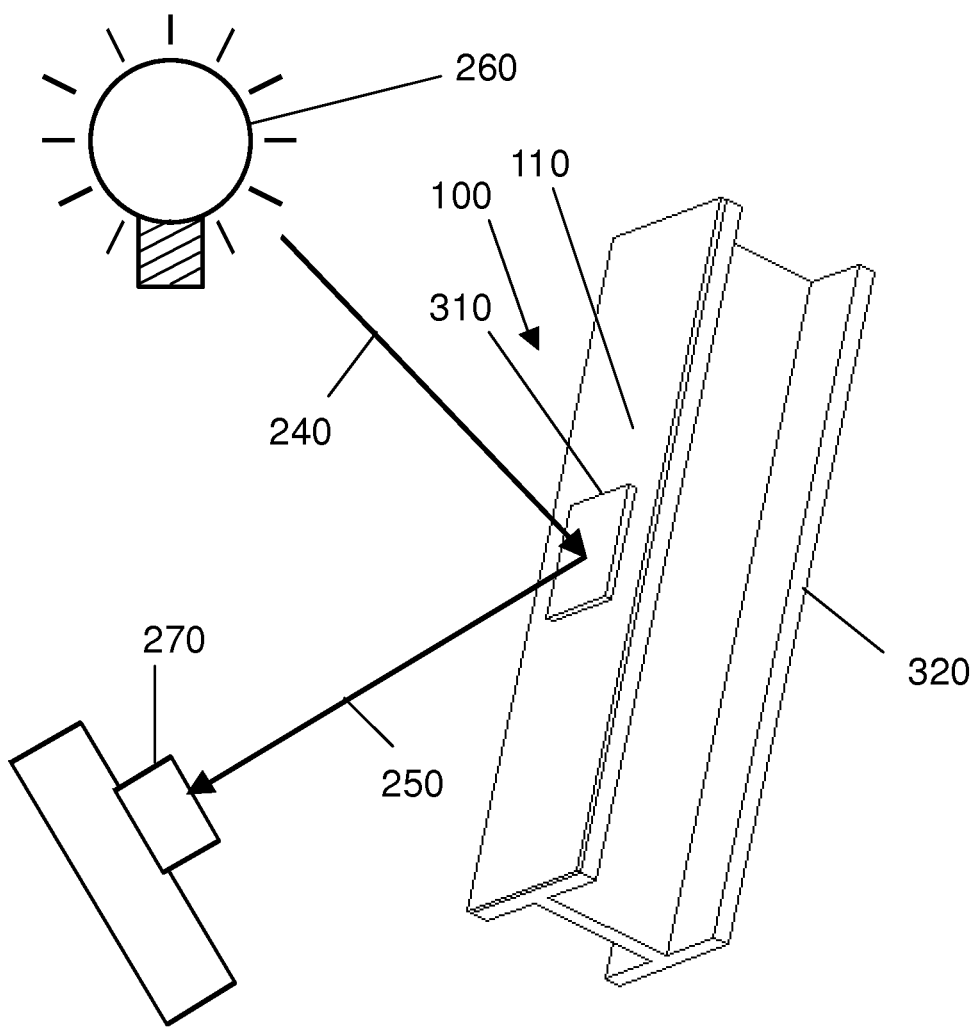
FIG. 3 is a diagrammatic view showing the use of a photoelastic structural monitoring coating according to an embodiment of the present invention.

Description of an Example of a Photoelastic Structural Monitoring Coating—FIG. 3

FIG. 3 is a diagrammatic view of a photoelastic structural monitoring coating with an integrated polarizer according to an embodiment of the present invention. A structure 320 is coated with a photoelastic coating 100 comprising a photoelastic layer 110. Structure 320 is shown diagrammatically as an I-beam, but it could be any type of structural member. Structure 320 can be a large structure such as a bridge, a building, an airplane, or some other piece of transportation or industrial equipment. Photoelastic layer 110 is applied to structure 320 as a solvent-based liquid or gel that cures at ambient temperatures, as described in previous figures. In this example, structure 320 is made out of a silvery metal such as steel or aluminum so no reflective layer is required between photoelastic layer 110 and structure 320.

In this example, applying a photoelastic layer for structural monitoring to structure 320 using powder coating methods is not practical. This can be the case for large structures, structures that cannot be heated to the temperatures required for powder coating, or pre-existing structures in the field. In particular, structures that do not fit into an oven are difficult to apply a photoelastic coating to using powder coat methods. Some structures such as pipelines can be powder coated using induction heating in a continuous process, but the cross sectional area of these types of structures is typically smaller and fairly uniform. In this case, structure 320 can be too large to fit in a typically industrial oven. For example, it can be larger than about 8 cubic meters or be heavier than about 80 kg. Large structures or structures with significant mass can be difficult or impractical to powder coat because of the size of oven that would be required to house the structure, and because of the amount of energy that would be required to heat the structure up to the temperature required for powder coating. The larger the structure is, the more difficult the problem becomes. A photoelastic structural monitoring coating 100 applied to structure 320 as a solvent-based liquid or gel without the need for heat for curing is a solution to this problem and can be applied much more readily than powder coated photoelastic coatings to structure 320.

Referring still to FIG. 3, photoelastic coating 100 can also comprise an integrated polarizer 310. Integrated polarizer 310 is attached on top of the photoelastic layer 110 to facilitate inspections using photoelastic methods. Integrated polarizer 310 allows photoelastic analysis techniques to be used for inspections on structure 320 without the need for an external polarized light source. An example of a material that can be used to make integrated polarizer 310 is a polyvinyl alcohol (PVA) polymer. Other materials are possible. Examples of PVA polarizers and other types of polarizers are available from American Polarizers, Inc. of Reading, Pa. Integrated polarizer 310 can be attached to structure 320 such that it covers all of photoelastic layer 110 or only a portion of photoelastic layer 110. Integrated polarizer 310 can be permanently or temporarily attached to structure 320 for example by using adhesive, bolts, rivets, tape, or other means. Polarizing filter 310 could also be applied using powder coating, wet coating, or some other coating method. Integrated polarizer 310 can also comprise a quarter wave plate for changing the linearly polarized light to circularly polarized light and vice versa.

Inspections can be performed to detect for stresses and strains by illuminating with incident light 240 from a light source 260. Integrated polarizer 310 allows a regular light source to be used such as a light bulb, or ambient light from the sun. Incident light 240 passes through integrated polarizer 310, through photoelastic layer 110, reflects off the back surface of photoelastic layer 110, travels back through photoelastic layer 110, and back through integrated polarizer 310 to a detector or camera 270. Reflected light 250 can also be viewed by an observer. The presence of fringe patterns can indicate that structure 320 is currently under stress and strain or that it has been permanently deformed as a result of excessive stresses and strains. The number of fringes can indicate to a person skilled in the art of photoelastic analysis the nature and magnitude of the stresses and strains involved. If fringe patterns are observed while the structure is no longer load, this can indicate that permanent deformation has occurred in structure 320, suggesting that it has been overloaded. Once the inspection is completed, integrated polarizer 310 remains attached to the structure. This means that no special equipment is required to perform the inspection and makes inspections faster and less costly. The inspector does not need to carry around any polarizing filters or sources of polarized light, and inspections can be performed with a regular instrument such as a digital camera. Integrated polarizer 310 can also facilitate inspections for structural monitoring by indicating to the inspector where the points of interest requiring inspection are located. If the inspection location is far away from the inspector, a camera with a telephoto lens can be used to perform the inspection.

Figure 4:
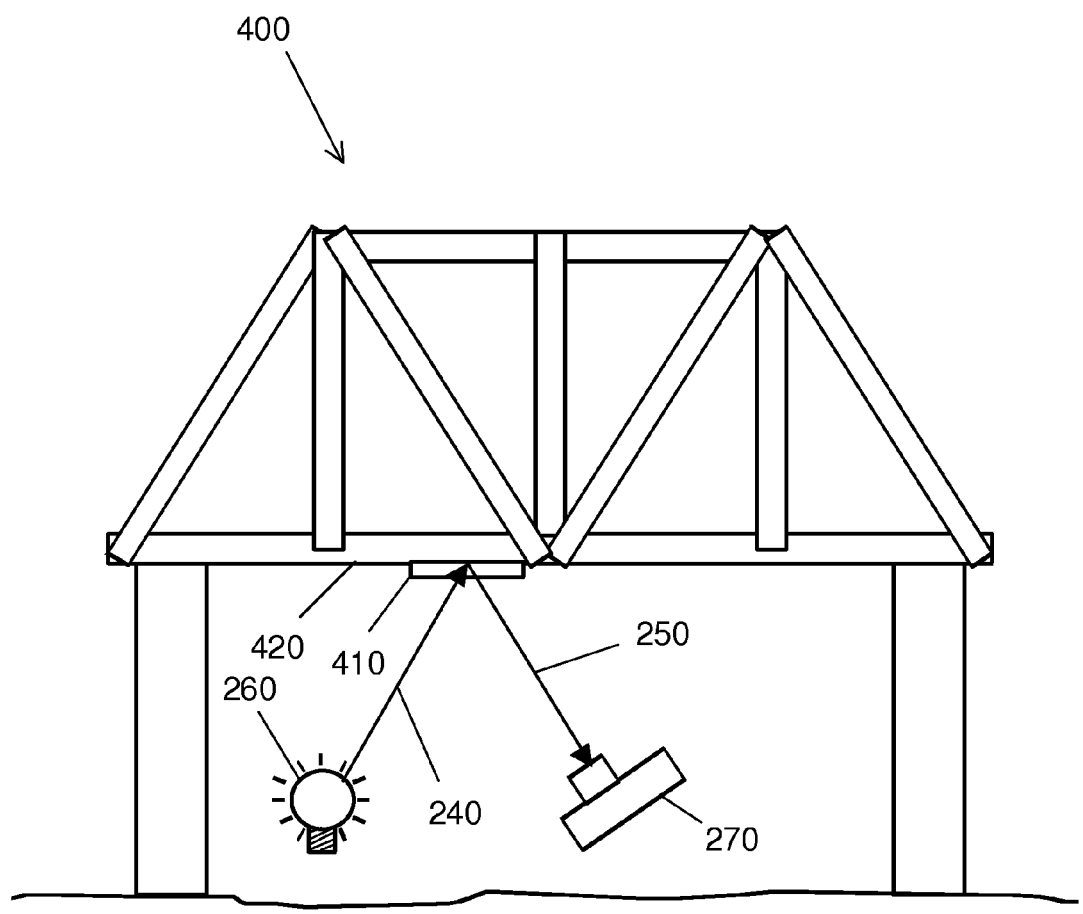
FIG. 4 is a diagrammatic view showing the inspection of a bridge structure coated with a photoelastic structural monitoring coating according to an embodiment of the present invention.

Description of an Example of a Photoelastic Structural Monitoring Coating—FIG. 4

FIG. 4 is a diagrammatic view of a structure coated with a photoelastic structural monitoring coating according to an embodiment of the present invention. In this example, a structure 400 such as a bridge has been previously installed in the field. The structure is too large, too heavy, and too immobile to have a photoelastic coating applied to it using powder coat methods or traditional photoelastic methods. However, structure 400 is regularly subjected to service loads (e.g., by traffic crossing over the bridge deck), and regular inspections are desirable to ensure structure 400 has not been overloaded. If it has been overloaded, permanent deformation may be present indicating an unsafe condition. Detecting if the structure has experienced excessive stresses and strains, or in particular plastic deformation, can help to predict potential failure of the structure with greater accuracy and improve safety.

In this example, structure 400 is shown as a bridge and is larger than approximately 8 $m^3$ and involves much more than roughly 80 kg of base material. This structure is much too large to fit inside a typical industrial oven, and much too massive to justify heating up the whole structure enough to cure the powder coating. As such, applying a photoelastic layer to structure 400 using powder coating is impractical and inconvenient. According to the present invention, a photoelastic coating 420 is applied to structure 400 using as a solvent-based liquid or gel and then cured without the need for additional heat at temperatures below 100° C. It can also be cured at ambient temperatures for example in the range from minus 15° C. to 65° C. Once applied, structural monitoring coating 420 makes monitoring the bridge using photoelastic analysis easy and economical. Inspections can be quickly and cost-effectively performed to detect stresses and strains and particularly plastic deformation. Coating 420 when cured can also serve a dual purpose of providing environmental protection for structure 400 as well as providing stress strain information on structure 400.

In this example, an integrated polarizing filter 410 is attached to a portion of photoelastic layer 420. Inspections can be performed to detect stress and strain levels being experienced in structure 400, or that have been experienced in the past by structure 400, by illuminating integrated polarizer 410 with a light source 260. Incident light 240 passes through integrated polarizer 410 and photoelastic layer 420. The light is reflected and passes back through photoelastic layer 420 and integrated polarizer 410. Fringe patterns in reflected light 250 can be detected by a detector or by a camera 270. If structure 400 is not being subjected to service loads at the time of the inspection, the presence of fringe patterns could indicate that plastic deformation of structure 400 has occurred in the area of inspection. If structure 400 is being subjected to service loads while the inspection is proceeding, fringe patterns can indicate the degree stress and strain being experienced by structure 400 in response to those service loads. After each inspection, integrated polarizer 410 remains attached to photoelastic layer 420 and structure 400 ready for the next inspection. Multiple integrated polarizers can be located at different locations on structure 400. In another example, integrated polarizer 410 is not required to perform photoelastic inspections on structure 400. Photoelastic inspections can also be carried out using portable polarizing filters to illuminate an area to be inspected with polarized light, and viewing of the reflected light through a second polarizing filter or through an instrument equipped with a polarizing filter can reveal fringe patterns that provide stress strain information.

Figure 5:
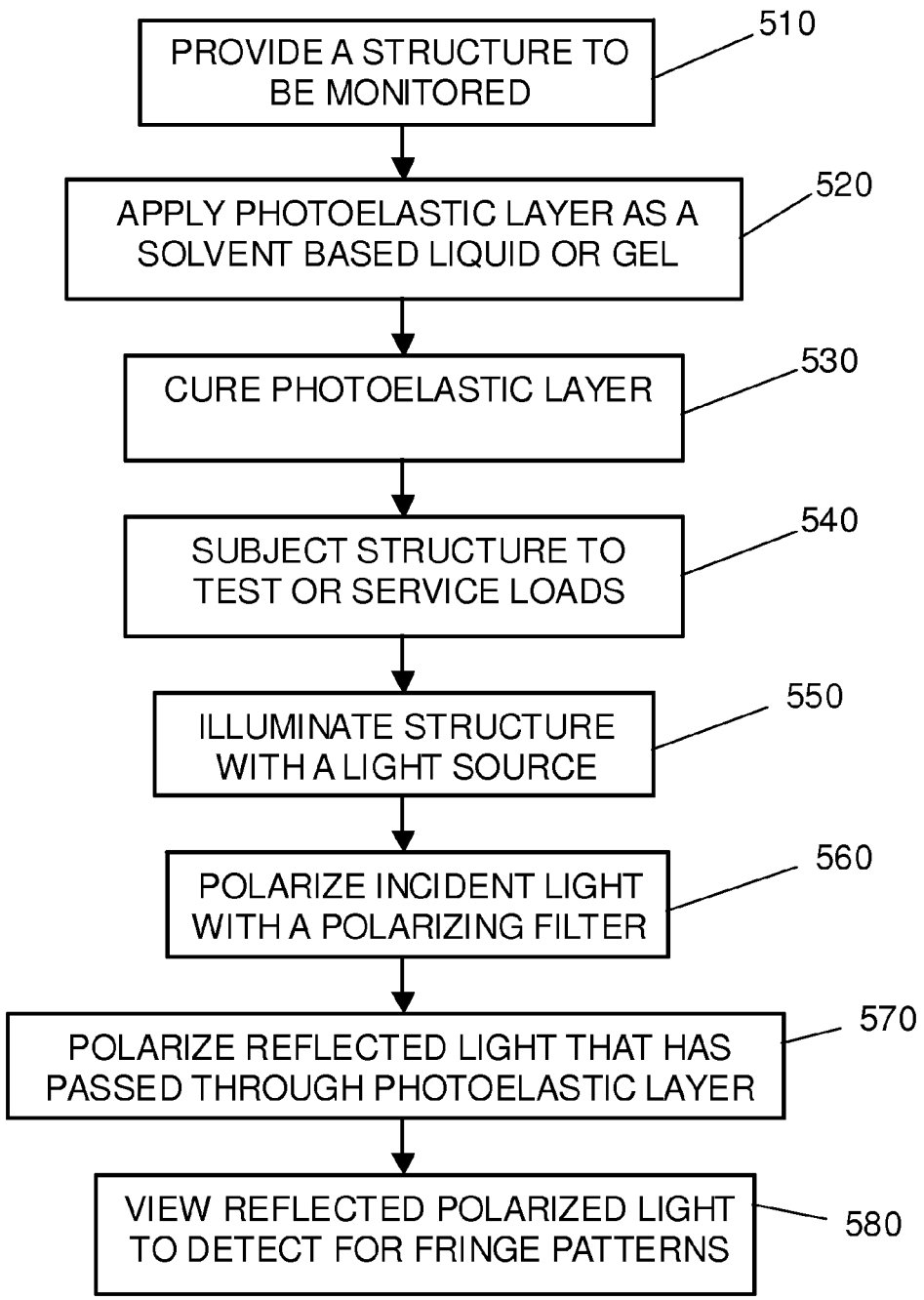
FIG. 5 is a flow chart showing a series of steps for inspecting structures using a structural monitoring coating according to an embodiment of the present invention.

Description of Example Method for Structural Monitoring—FIG. 5

FIG. 5 describes a method for structural monitoring on structures such as bridges and buildings using a photoelastic structural monitoring coating according to an embodiment of the present invention. The method comprises a step 510 of providing a structure or part for testing or monitoring. The structure can be a large structure that will not typically fit into an oven (e.g., occupying a space larger than about 8 $m^3$), a structure that has significant mass that would have to be heated up (e.g., more massive than about 80 kg), or a structure already installed in the field for which applying a photoelastic layer using powder coating is inconvenient or impractical. In this example the structure can be a metallic structure with a shiny reflective surface, in which case no reflective layer is required. However, an additional step of applying a reflective layer (e.g., of a silver colour) can be taken if the surface of structure is not appropriate, or if a more uniform reflective layer is desired. The method comprises a step 520 of applying a translucent or transparent photoelastic layer as a solvent-based liquid or a gel, and a step 530 of curing the photoelastic layer. Curing can be accomplished by evaporation of the solvent, by addition of a chemical hardener, by UV or visible light curing, or curing by other means to form a continuous coating over the structure. Curing can most conveniently be accomplished at temperatures below 100° C., and preferably at ambient temperatures in the range of about −15° C. to 60° C. The method can further comprise a step 540 of subjecting a structure to test or service loads. The method can also comprises a step 550 of illuminating the structure with a light source (either artificial or natural), and a step 560 of polarizing at least a portion of the incident light with a polarizing filter. The polarizing filter can be integrated into the coating by attaching it to the structure, or it can be separate from the structure or it can be part of an instrument used for photoelastic analysis. A step 570 comprises using a polarizing filter to polarize at least a portion of the reflected light that has passed through the photoelastic layer and reflected back through the photoelastic layer off the structure or a reflective layer. The polarizing filter for the reflected light can be attached to the structure on top of the photoelastic layer, or it can be separate from the structure. The method can further comprise a step 580 of viewing at least some of the polarized reflected light to detect for fringe patterns resulting from stresses and strains in the photoelastic layer. The fringe patterns can be viewed by an observer or detected by an instrument such as a camera. With a camera, the images can be recorded and further analyzed. The fringe patterns provide information regarding the stresses and strains and any plastic deformation that has occurred in the underlying structure. For example, the presence of fringe patterns in the reflected light when the structure is not subject to a load suggests that the structure has been overloaded and that plastic deformation has occurred in the region where the fringe patterns are evident. If the structure is under load, the number of visible fringe patterns can provide information regarding the magnitude of stresses and strains being experienced by the structure as a result of those loads, as well as information regarding the location of stresses and strains in a structure.

In summary, the present invention provides a coating for structures and parts such as bridges and buildings that are too large or otherwise impractical to apply a photoelastic layer to using powder coating methods. The coating is applied as a solvent-based liquid or gel and is cured without the need for heat. Curing methods could include evaporation of the solvent, by addition of a chemical hardener, or by UV or visible light curing. The coating can provide environmental and corrosion protection for the structure in addition to stress/strain monitoring information.

Advantageous Effects of Invention

From the description above, specific embodiments of a photoelastic structural monitoring coating and a method for structural monitoring using a photoelastic structural monitoring coating may provide one or more of the following advantages:

Structures such as bridges can be monitored for excessive stress strain levels and overloading.
Inspections can also be made quickly and at relatively low cost compared to existing NDT methods.
Structures, particularly large structures or pre-existing structures, can be monitored and inspected for excessive stress or failures using relatively inexpensive photoelastic techniques.
No electronics or data loggers are required to be present on an ongoing basis, greatly reducing the cost of the system and maintenance requirements.
Peak stress events that may be of short duration are less likely to be missed, as is possible with data logging systems with an inherent sampling rate that may miss peak stress events if they occur between sampling times.
The structural monitoring coating can be applied to larger structures that are impractical to coat with a photoelastic powder coating.
Minimal training is required to analyze the data from the tests.
Catastrophic failures can potentially be avoided by detecting plastic deformation and early signs of failure before catastrophic failure occurs.
Structures that cannot have a photoelastic coating applied using dry powder coating methods can typically be coated using liquid or gel-based coatings because these coatings can cure at ambient temperatures and do not require heating to elevated temperatures.
The coating can provide environmental protection as well as monitoring capability.
Many structures already have a coating applied to them for environmental protection. A coating that also has photoelastic properties increases the value of the coating and means the same coating can be used for monitoring the structure as well as for protecting it.

Many modifications, substitutions, and improvements will be apparent to the skilled artisan without departing from the spirit and scope of the present invention as described herein and defined in the claims.

INDUSTRIAL APPLICABILITY

The present invention has industrial applicability in a number of fields, including the field of structural monitoring. The present invention can be used on structures such as bridges, buildings, airplanes, and industrial equipment in order to allow easier and more rapid inspections for stress strain and in particular overloading. Facilitating easier and lower-cost inspections can help to improve public safety and can potentially help inspectors to catch failures before they become catastrophic.

We claim:

1. A structure subjected to service loads in actual field use combined with a structural monitoring coating applied to said structure, said structural monitoring coating comprising an optically translucent or transparent photoelastic layer, a means for curing said structural monitoring coating from a liquid or a gel into a solid after application to said structure, and a reflective surface or layer interposed between said photoelastic layer and said structure, whereby the photoelastic properties of said photoelastic layer are used to detect stress and strain or plastic deformation in said structure by illuminating said photoelastic layer with polarized light and viewing the reflected light through a polarizer.

2. A structural monitoring coating according to claim 1 wherein said structural monitoring coating comprises a polymer.

3. A structural monitoring coating according to claim 1 wherein said means for curing said structural monitoring coating from a liquid or a gel into a solid occurs at temperatures of 100° C. or less.

4. A structural monitoring coating according to claim 1 wherein said means for curing said structural monitoring coating from a liquid or a gel into a solid occurs at a temperature in the range from −15° C. to 60° C.

5. A structural monitoring coating according to claim 1 wherein said means for curing said structural monitoring coating from a liquid or a gel into a solid occurs through evaporation of a solvent, the presence of a chemical hardener, or by exposure to UV or visible light.

6. A structural monitoring coating according to claim 1 wherein said structural monitoring coating further comprises an integrated polarizer that is attached on top of photoelastic material for polarizing incident non-polarized light.

7. A structural monitoring coating according to claim 1 wherein said structural monitoring coating comprises an epoxy material.

8. A structural monitoring coating according to claim 1 wherein said structure comprises a bridge.

9. A structural monitoring coating according to claim 1 wherein said structure occupies a volume greater than 8 cubic meters.

10. A structural monitoring coating according to claim 1 wherein said structure has a mass greater than 80 kg.

11. A method of structural monitoring comprising the steps of:
a) Providing a structure for which structural monitoring is desired,
b) Providing a reflective surface on at least a portion of the surface of said structure or applying a reflective layer on at least a portion of said structure,
c) Applying an optically translucent or transparent photoelastic layer to at least a portion of said structure as a solvent-based liquid or a gel,
d) Curing said photoelastic layer in place on said structure,
e) Subjecting said structure to service loads, and f) Inspecting said structure to detect for stress and strain in said photoelastic layer by illuminating said photoelastic layer with polarized light and viewing the reflected light whereby the presence of fringe patterns in the reflected light from said photoelastic layer indicates the presence of stress and strain or of plastic deformation in said structure.

12. The method according to claim 11 wherein the step of applying an optically translucent or transparent photoelastic layer comprises applying an optically translucent or transparent photoelastic layer comprising a polymer.

13. The method according to claim 11 wherein the step of curing said photoelastic layer comprises curing at a temperature below 100° C.

14. The method according to claim 11 wherein the step of curing said photoelastic layer comprises curing at a temperature in the range from −15° C. to 60° C.

15. The method according to claim 11 wherein the step of curing said photoelastic layer comprises curing by evaporation of a solvent, by inclusion of a chemical hardener, or by exposure to UV or visible light.

16. The method according to claim 11 further comprising the step of applying a polarizing layer on top of said photoelastic layer for polarizing the incident non-polarized light and the reflected light.

17. The method according to claim 11 wherein the step of providing a structure for which structural monitoring is desired comprises providing a bridge for which structural monitoring is desired.

18. The method according to claim 11 wherein the step of providing a structure for which structural monitoring is desired comprises providing a structure that occupies a volume greater than 8 cubic meters.

19. The method according to claim 11 wherein the step of providing a structure for which structural monitoring is desired comprises providing a structure that has a mass greater than 80 kg.

20. The method according to claim 11 wherein the step of subjecting said structure to service loads comprises subjecting said structure to service loads from actual field use.

21. The method according to claim 11 wherein the step of inspecting said structure to detect for stress and strain in said photoelastic layer comprises inspecting said structure to detect for strain resulting from plastic deformation, whereby the presence of plastic deformation indicates said structure has been overloaded.

* * * * *